(12) United States Patent
Chen et al.

(10) Patent No.: US 10,028,125 B2
(45) Date of Patent: Jul. 17, 2018

(54) D2D SIGNAL TRANSMISSION METHOD AND DEVICE

(71) Applicant: China Academy of Telecommunications Technology, Beijing (CN)

(72) Inventors: Wenhong Chen, Beijing (CN); Qiubin Gao, Beijing (CN); Ying Peng, Beijing (CN); Rui Zhao, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 15/111,344

(22) PCT Filed: Jan. 14, 2015

(86) PCT No.: PCT/CN2015/070678
§ 371 (c)(1),
(2) Date: Jul. 13, 2016

(87) PCT Pub. No.: WO2015/106683
PCT Pub. Date: Jul. 23, 2015

(65) Prior Publication Data
US 2016/0345297 A1 Nov. 24, 2016

(30) Foreign Application Priority Data
Jan. 16, 2014 (CN) .......................... 2014 1 0020037
Sep. 25, 2014 (CN) .......................... 2014 1 0498703

(51) Int. Cl.
*H04W 8/00* (2009.01)
*H04W 72/04* (2009.01)
(Continued)

(52) U.S. Cl.
CPC ........... *H04W 8/005* (2013.01); *H04L 5/0012* (2013.01); *H04W 48/10* (2013.01); *H04W 72/02* (2013.01);
(Continued)

(58) Field of Classification Search
CPC ........... H04W 76/023; H04W 72/0406; H04W 72/042; H04W 8/005; H04W 72/0453; H04W 72/048; H04W 76/021
See application file for complete search history.

(56) References Cited

U.S. PATENT DOCUMENTS

| | | |
|---|---|---|
| 8,121,097 B2 | 2/2012 | Li et al. |
| 2010/0110929 A1 | 5/2010 | Li et al. |

(Continued)

FOREIGN PATENT DOCUMENTS

| | | |
|---|---|---|
| CN | 101932073 A | 2/2010 |
| CN | 102204293 A | 9/2011 |

(Continued)

OTHER PUBLICATIONS

International Search Report corresponding to PCT/CN2015/070678, dated Mar. 13, 2015.
(Continued)

*Primary Examiner* — Raj Jain
(74) *Attorney, Agent, or Firm* — Kilpatrick Townsend & Stockton LLP

(57) ABSTRACT

Disclosed in the present application is a D2D signal transmission method and device, used for enabling a UE, on the basis of the D2D parameters thereof, to determine a resource hopping pattern between different D2D transmission physical resources, and thereby obtain a plurality of D2D transmission physical resources, such that a D2D UE transmitting a D2D signal at any time in the same sub-frame can subsequently transmit a D2D signal in a different sub-frame, (Continued)

thus improving the overall D2D transmission performance of the system. The method provided in the present application comprises: a first UE, on the basis of pre-set D2D parameters, determines the resource hopping pattern between a plurality of D2D transmission physical resources needed to be used by the first UE; the first UE, on the basis of said resource hopping pattern, determines the plurality of D2D transmission physical resources; and the first UE sends a D2D signal on the determined plurality of D2D transmission physical resources.

20 Claims, 6 Drawing Sheets

(51) Int. Cl.
H04W 72/02 (2009.01)
H04L 5/00 (2006.01)
H04W 48/10 (2009.01)

(52) U.S. Cl.
CPC ...... *H04W 72/0406* (2013.01); *H04W 72/048* (2013.01)

(56) References Cited

U.S. PATENT DOCUMENTS

| | | | |
|---|---|---|---|
| 2010/0190459 A1 | 7/2010 | Li et al. | |
| 2014/0370904 A1* | 12/2014 | Smith | H04W 8/005 455/450 |
| 2015/0003263 A1* | 1/2015 | Senarath | H04L 5/0051 370/252 |
| 2015/0195823 A1* | 7/2015 | Seo | H04W 72/0406 370/329 |
| 2015/0264551 A1* | 9/2015 | Ko | H04W 8/005 370/329 |
| 2016/0057693 A1* | 2/2016 | Nagata | H04W 8/005 370/254 |
| 2016/0174194 A1* | 6/2016 | Suzuki et al. | H04B 1/713 370/312 |
| 2016/0278069 A1* | 9/2016 | Lee | H04W 48/08 |
| 2016/0345297 A1* | 11/2016 | Chen | H04W 72/02 |

FOREIGN PATENT DOCUMENTS

| | | |
|---|---|---|
| CN | 103026771 A | 4/2013 |
| CN | 103036662 A | 4/2013 |
| JP | 2012507974 A | 3/2012 |
| KR | 20110083719 A | 7/2011 |
| WO | 2014139475 A1 | 9/2014 |

OTHER PUBLICATIONS

Translation of PCT Written Opinion for the International Patent Application PCT/CN2015/070678, dated Mar. 24, 2015. El.
Huawei et al; "Comparison of Type 1, Type 2a, and Type 2b Discovery Resource Allocation". 3GPP Draft; R2-133278 Comparison of Type 1, 2A, and 2B Discovery Resource Allocation, 3rd Generation Partnership Project (3GPP), Mobile Competence Centre ; 650, Route Des Lucioles ; F-06921 Sophia-Ant vol. RAN WG2, No. Ljubljana, Slovenia; Oct. 7, 2013-Oct. 11, 2013 Sep. 27, 2013 (Sep. 27, 2013),XP050718969, Retrieved from the Internet: URL:http://www.3gpp.org/ftp/tsg_ran/WG2_RL2/ TSGR2_83bis/ Docs/ [retrieved on Sep. 27, 2013].
LG Electronics: "Resource Allocation and UE Behavior for Discovery Type 1 and Type 2"; 3GPP Draft; R1-133388 Resource Allocation and UE Behavior for Discovery LG, $3^{rd}$ Generation Partnership Project (3GPP), Mobile Competence Centre; 650, Route Des Lucioles ; F-06921 Sophia-Antipolis Ced; vol. RAN WG1, No. Barcelona, Spain; Aug. 19, 2013-Aug. 23, 2013 Aug. 10, 2013 (Aug. 10, 2013), XP050716502, Retrieved from the Internet: URL:http://www.3gpp.org/ftp/tsg_ran/WG1_RL1/TSGR1_74/ Docs/ [retrieved on Aug. 10, 2013].
Huawei et al: "System-level performance of D2D discovery", 3GPP Draft; R1-134074, 3rd Generation Partnership Project (3GPP), Mobile Competence Centre ; 650, Route Des Lucioles ; F-06921 Sophia-Antipolis Cedex; France vol. RAN WG1, No. Guangzhou, China; Oct. 7, 2013-Oct. 11, 2013 Sep. 28, 2013 (Sep. 28, 2013), XP050717266, Retrieved from the Internet: URL:http://www.3gpp. org/ftp/tsg_ran/WG1_RL1/TSGR_74b/Docs/ [retrieved on Sep. 28, 2013].
NTT Docomo et al: "Views on D2D discovery resource allocation", 3GPP Draft; R1-135522 Views on D2D Discovery Resource Allocation, $3^{rd}$ Generation Partnership Project (3GPP), Mobile Competence Centre; 650, Route Des Lucioles ; F-06921 Sophia-Antipolis Cedex ; France , vol. RAN WG1, No. San Francisco, USA; Nov. 11-2013-Nov. 15, 2013 Nov. 13, 2013 (Nov. 13, 2013), XP050735194, Retrieved from the Internet: URL:http://www.3gpp. org/ftp/Meetings_3GPP_SYNC/RAN/RAN1/Docs/ [retrieved on Nov. 13, 2013].
Catt: "Further discussion on resource allocation for D2D discovery", 3GPP Draft; R1-135089, 3rd Generation Partnership Project (3GPP), Mobile Competence Centre ; 650, Route Des Lucioles ; F-06921 Sophia-Antipolis Cedex; France vol. RAN WG1, No. San Francisco, USA; Nov. 11, 2013-Nov. 15, 2013 Nov. 1, 2013 (Nov. 1, 2013), XP050750589, Retrieved from the Internet: URL:http:// www.3gpp.org/ftp/tsg_ran/WG1_RL/TSGR1_75/Docs/ [retrieved on Nov. 1, 2013].

\* cited by examiner

D2D SIGNAL TRANSMISSION METHOD AND DEVICE

This application is a US National Stage of International Application No. PCT/CN2015/070678, filed on Jan. 14, 2015, designating the United States, and claiming the benefit of Chinese Patent Applications No. 201410020037.0, filed with the Chinese Patent Office on Jan. 16, 2014 and entitled "D2D signal transmission method and device", and No. 201410498703.1, filed with the Chinese Patent Office on Sep. 25, 2014 and entitled "D2D signal transmission method and device", both of which are hereby incorporated by reference in their entireties.

FIELD

The present application relates to the field of communications, and particularly to a Device to Device (D2D) signal transmission method and device.

BACKGROUND

A User Equipment (UE) transmitting a D2D signal can only operate in a half-duplex mode, but can not detect a D2D signal of another UE in a sub-frame in which the UE transmits the D2D signal, so if the D2D signals of the two UEs are transmitted in the same sub-frame, then they will not discover each other in the sub-frame. Furthermore if they are still transmitted over the same frequency resource, then they will interfere with each other due to resource collision. If they are transmitted over different frequency resources, then the probability that the other UEs detect their D2D signals successfully will drop due to in-band emission interference. The overall performance of D2D transmission in the system will drop in either of the scenarios.

The prior art will be introduced below in details.

Device to Device (D2D) communication refers to direct communication between UEs, where the adjacent UEs can transmit data over a direct link in a short-distance range so that the data will not be forwarded by a central node (i.e., a base station), as illustrated in FIG. 1. The D2D technology has the following advantages due to its characteristic of short-distance communication, and direct communication mode:

The UEs can communicate directly over a short distance to thereby achieve a higher data rate, a shorter delay, and lower power consumption;

Spectrum resources can be utilized efficiently by the UEs widely distributed in the network due to the short distance characteristic of the D2D communication link;

The direct communication mode of D2D can be adapted to a demand of, e.g., wireless Peer to Peer (P2P) and other services, for sharing local data so as to provide a flexibly adaptive data service; and The large number of UEs widely distributed in the network can be utilized in direct D2D communication to extend a coverage area of the network.

The LTE D2D technology refers to D2D discovery and communication procedures, controlled by an LTE network, operating in an LTE licensed frequency band. On one hand, the D2D technology can make full use of the original advantages of the D2D technology, and also some problems of the traditional D2D technology, e.g., uncontrollable interference, etc., can be overcome due to the controlling by LTE network. The introduction of the LTE D2D characteristic enables the LTE technology to evolve from the pure wireless mobile cellular communication technology toward the Universal Connectivity Technology (UCT).

The D2D technology includes a D2D discovery and D2D communication, and allocation of D2D transmission physical resources will be described below taking a D2D discovery as an example.

During a D2D discovery, the UE needs to know both a receive resource area (in which the UE receives a discovery signal of another UE) and a transmit resource area (in which the UE transmits its own discovery signal), but it is impossible for the UE to both transmit and receive the discover signals in the same sub-frame due to its hardware restriction. Typically, system discovery resources include a set of sub-frames or a set of Physical Resource Blocks (PRBs), and a periodicity at which the set of sub-frames or the set of PRBs occurs, where the periodicity is a system discovery resource periodicity, as illustrated in FIG. 2. A system discovery resource periodicity can include several sub-frames, each of which includes several PRBs, and typically, these sub-frames or PRBs are consecutive uplink or downlink resources (e.g., consecutive uplink sub-frames). In each discovery resource periodicity, the UE can detect, in each sub-frame in which the discovery signal of the UE is not transmitted, the discovery signal of the other UE. If the UE is in the coverage area of the network, then the system discovery resources are typically configured by the base station, and if there is no network coverage, the system discovery resources can be configured by a cluster head or can be predefined. Those system discovery resources (i.e., sub-frames) over which the UE is allowed to transmit its own discovery signal can also be configured by the network or the cluster head, or determined under a prescribed rule. Particularly one of the system discovery resources over which the UE transmits the discovery signal can be selected by the UE from the allowable resources (i.e., a type 1 of discovery), or can be configured by the base station (i.e., a type 2 of discovery).

During the D2D discovery, the UE can only operate in the half-duplex mode, but can not detect the discovery signal of the other UE in the sub-frame in which the UE transmits the D2D signal, so if the D2D signals of two UEs are transmitted in the same sub-frame, then they will not discover each other in the periodicity. Furthermore if they are still transmitted over the same frequency resource, then they will interfere with each other due to resource collision; and if they are transmitted over different frequency resources, then the probability that the other UEs detect their D2D signals successfully will drop due to in-band emission interference. Typically if there is a smaller spacing between the frequency resources of the UEs transmitting the signals in the same sub-frame, then there is a more serious in-band emission interference.

In the discussion of D2D in the prior art, there has been proposed a resource hopping pattern between the discovery resources of the UEs in different discovery resource periodicities so that there is a fixed resource hopping relationship between the discovery resources of the UE in the different discovery resource periodicities, and thus the D2D UEs transmitting over different frequency resources in the same sub-frame can subsequently discover each other while transmitting over discovery resources in different sub-frames. For example, the following resource hopping pattern is applied to the UE:

$$SF(i)=[\text{floor}(PRB(0)/nSF)*i*i+\text{mod}(PRB(0),nSF)*i+SF(0)] \bmod nSF$$

$$PRB(i)=[PRB(0)+3*i] \bmod nRB$$

Where SF(i) represents the index of a sub-frame where a discovery resource of the UE is located in a discovery resource periodicity with the index i; PRB(i) represents the index of a PRB where the discovery resource of the UE is located in the discovery resource periodicity with the index i, nSF represents the total number of discovery sub-frames in a discovery resource periodicity, and nRB represents the total number of PRB resources in a discovery resource periodicity.

However in the existing resource hopping solution, the UEs occupying the different frequency resources in the same sub-frame can discover each other in the subsequent transmission, but the different UEs occupying the same frequency resource in the same sub-frame may still collide with each other in the subsequent transmission and thus can not discover each other, thus degrading the overall discovery probability of the system. Moreover in the existing hopping solution, the receiving end can not know from a physical resource over which the D2D signal is detected at some instance of time, a physical resource over which the UE sends the D2D signal next time, but has to perform blind detection again next time, thus increasing the complexity at which the UE subsequently detects the D2D signal.

SUMMARY

Embodiments of the application provide a D2D signal transmission method and device so that a UE determines a resource hopping pattern between different D2D transmission physical resources according to its own D2D parameter to thereby be provided with the D2D transmission physical resources, so the D2D UEs transmitting the D2D signals in the same sub-frame at any instance of time can transmit the D2D signals in different sub-frames during the subsequent transmission, thus improving the overall performance of D2D transmission in the system.

An embodiment of the application provides a method for sending a D2D signal, the method including:

determining, by a first UE, a resource hopping pattern between a plurality of D2D transmission physical resources of the first UE, according to a preset D2D parameter;

determining, by the first UE, the D2D transmission physical resources according to the resource hopping pattern; and sending, by the first UE, a D2D signal over the determined D2D transmission physical resources.

With this method, the UE determines the resource hopping pattern between the different D2D transmission physical resources according to its own D2D parameter to thereby obtain a plurality of D2D transmission physical resources, and thus the UEs transmitting the D2D signals in the same sub-frame at any instance of time can transmit the D2D signal in different sub-frames during the subsequent transmission, thus improving the overall performance of transmitting the D2D signals in the system. Moreover the receiving UE can know from the D2D transmission physical resource over which the D2D signal is detected at any instance of time, the D2D transmission physical resource over which the UE sending the D2D signal sends the D2D signal at the next instance of time, and thus can subsequently simply detect the D2D signal over the corresponding D2D transmission physical resource, thus decreasing the complexity at which the UE detects the D2D signal.

Preferably the D2D parameter includes any one of the following parameters:

a hopping index of the first UE pre-configured by the network side via higher-layer signaling;

a D2D identifier (ID) of the first UE;

a D2D ID of a target UE of the first UE;

a D2D application ID of the first UE;

a D2D application user ID of the first UE;

a D2D application user ID of the target UE of the first UE;

a D2D device ID of the first UE;

a D2D device ID of the target UE of the first UE;

an IP address of the first UE;

an IP address of the target UE of the first UE;

Global Positioning System (GPS) location information of the first UE;

a broadcast ID of the first UE;

information carried in the D2D signal transmitted by the first UE; and a D2D hopping configuration parameter of the first UE.

Preferably the D2D parameter is pre-configured by the network side.

Preferably determining, by the first UE, the resource hopping pattern between the D2D transmission physical resources of the first UE, according to the preset D2D parameter includes:

determining, by the first UE, a resource hopping pattern in frequency domain between the D2D transmission physical resources of the first UE, according to the preset D2D parameter; or determining, by the first UE, a resource hopping pattern in time domain between the D2D transmission physical resources of the first UE, according to the preset D2D parameter; or determining, by the first UE, a resource hopping pattern in frequency domain between the D2D transmission physical resources of the first UE, according to the preset D2D parameter, and determining a resource hopping pattern in time domain between the D2D transmission physical resources of the UE, according to the resource hopping pattern in frequency domain; or determining, by the first UE, a resource hopping pattern in time domain between the D2D transmission physical resources of the first UE, according to the preset D2D parameter, and determining a resource hopping pattern in frequency domain between the D2D transmission physical resources of the UE, according to the resource hopping pattern in time domain.

Preferably determining, by the first UE, the D2D transmission physical resources according to the resource hopping pattern includes:

determining, by the first UE, an initial D2D transmission physical resource by selecting the resource randomly, or measuring interference over candidate resources, or according to resource configuration information indicated by the network side or the other UE; and determining, by the first UE, the other D2D transmission physical resources according to the resource hopping pattern, and the initial D2D transmission physical resource.

Preferably the D2D signal includes the D2D parameter.

Preferably the D2D transmission physical resources are particularly one of:

physical resources for transmitting a D2D synchronization signal;

physical resources for transmitting a D2D discovery signal; and physical resources for transmitting a D2D communication signal.

Preferably the D2D signal is one of:

a D2D synchronization signal;

a D2D discovery signal; and a D2D communication signal.

Correspondingly an embodiment of the application provides a method for receiving a D2D signal at the receiving side, the method including:

determining, by a second UE, a first physical resource for transmitting a D2D signal of a first UE;

determining, by the second UE, a D2D parameter of the first UE;

determining, by the second UE, a resource hopping pattern between a plurality of D2D transmission physical resources of the first UE according to the D2D parameter of the first UE;

determining, by the second UE, the D2D transmission physical resources over which the first UE transmits the D2D signal, according to the first D2D transmission physical resource, and the determined resource hopping pattern; and detecting, by the second UE, the D2D signal of the first UE over the D2D transmission physical resources over which the first UE transmits the D2D signal.

With this method, the UE determines the resource hopping pattern between the different D2D transmission physical resources of the opposite UE in D2D communication therewith according to the D2D parameter of the opposite UE to thereby obtain the D2D transmission physical resources of the opposite UE, and further receives the D2D signal of the opposite UE, so that the UEs transmitting the D2D signals in the same sub-frame at any instance of time can transmit the D2D signal in different sub-frames during the subsequent transmission, thus improving the overall performance of transmitting the D2D signals in the system. Moreover the receiving UE can know from the D2D transmission physical resource over which the D2D signal is detected at any instance of time, the D2D transmission physical resource over which the UE sending the D2D signal sends the D2D signal at the next instance of time, and thus can subsequently simply detect the D2D signal over the corresponding D2D transmission physical resource, thus decreasing the complexity at which the UE detects the D2D signal.

Preferably determining, by the second UE, the first physical resource for transmitting the D2D signal of the first UE includes:

detecting, by the second UE, the D2D signal of the first UE, and determining a physical resource over which the D2D signal of the first UE is detected, as the first D2D transmission physical resource; or determining, by the second UE, the first D2D transmission physical resource for transmitting the D2D signal of the first UE, according to an indicator of the network side or the other UE.

Preferably determining, by the second UE, the D2D parameter of the first UE includes:

obtaining, by the second UE, the D2D parameter of the first UE from the D2D signal detected over the first D2D transmission physical resource; or determining, by the second UE, the D2D parameter of the first UE as a prescribed parameter; or determining, by the second UE, the D2D parameter of the first UE from an indicator of the network side or the other UE.

Preferably determining, by the second UE, the resource hopping pattern between the physical resources of the first UE according to the D2D parameter of the first UE includes:

determining, by the second UE, a resource hopping pattern in frequency domain between the D2D transmission physical resources of the first UE, according to the D2D parameter of the first UE; or determining, by the second UE, a resource hopping pattern in time domain between the D2D transmission physical resources of the first UE, according to the D2D parameter of the first UE; or determining, by the second UE, a resource hopping pattern in frequency domain between the D2D transmission physical resources of the first UE, according to the D2D parameter of the first UE, and to determine a resource hopping pattern in time domain between the D2D transmission physical resources of the first UE, according to the resource hopping pattern in frequency domain; or determining, by the second UE, a resource hopping pattern in time domain between the D2D transmission physical resources of the first UE, according to the D2D parameter of the first UE, and to determine a resource hopping pattern in frequency domain between the D2D transmission physical resources of the first UE, according to the resource hopping pattern in time domain.

An embodiment of the application provides a UE including:

a first resource hopping pattern determining unit configured to determine a resource hopping pattern between a plurality of D2D transmission physical resources of the first UE, according to a preset D2D parameter;

a first D2D transmission physical resource determining unit configured to determine the D2D transmission physical resources according to the resource hopping pattern; and a D2D signal sending unit configured to send a D2D signal over the determined D2D transmission physical resources.

With this UE, the UE determines the resource hopping pattern between the different D2D transmission physical resources according to its own D2D parameter to thereby obtain a plurality of D2D transmission physical resources, and thus the UEs transmitting the D2D signals in the same sub-frame at any instance of time can transmit the D2D signal in different sub-frames during the subsequent transmission, thus improving the overall performance of transmitting the D2D signals in the system. Moreover the receiving UE can know from the D2D transmission physical resource over which the D2D signal is detected at any instance of time, the D2D transmission physical resource over which the UE sending the D2D signal sends the D2D signal at the next instance of time, and thus can subsequently simply detect the D2D signal over the corresponding D2D transmission physical resource, thus decreasing the complexity at which the UE detects the D2D signal.

Preferably the D2D parameter includes any one of the following parameters:

a hopping index of the first UE pre-configured by the network side via higher-layer signaling;

a D2D identifier (ID) of the first UE;

a D2D ID of a target UE of the first UE;

a D2D application ID of the first UE;

a D2D application user ID of the first UE;

a D2D application user ID of the target UE of the first UE;

a D2D device ID of the first UE;

a D2D device ID of the target UE of the first UE;

an IP address of the first UE;

an IP address of the target UE of the first UE; Global Positioning System (GPS) location information of the first UE;

a broadcast ID of the first UE;

information carried in the D2D signal transmitted by the first UE; and a D2D hopping configuration parameter of the first UE.

Preferably the D2D parameter is pre-configured by the network side.

Preferably the first resource hopping pattern determining unit is configured:

to determine a resource hopping pattern in frequency domain between the D2D transmission physical resources of the UE, according to the preset D2D parameter; or to determine a resource hopping pattern in time domain between the D2D transmission physical resources of the UE, according to the preset D2D parameter; or to determine a resource hopping pattern in frequency domain between the D2D transmission physical resources of the UE, according to the preset D2D parameter, and to determine a resource hopping pattern in time domain between the D2D transmission physical resources of the UE, according to the resource hopping pattern in frequency domain; or to determine a resource hopping pattern in time domain between the D2D transmission physical resources of the UE, according to the preset D2D parameter, and to determine a resource hopping pattern in frequency domain between the D2D transmission physical resources of the UE, according to the resource hopping pattern in time domain.

Preferably the first D2D transmission physical resource determining unit is configured:

to determine an initial D2D transmission physical resource by selecting the resource randomly, or measuring interference over candidate resources, or according to resource configuration information indicated by the network side or the other UE; and to determine the other D2D transmission physical resources according to the resource hopping pattern, and the initial D2D transmission physical resource.

Preferably the D2D signal includes the D2D parameter.

Preferably the D2D transmission physical resources are one of:

physical resources for transmitting a D2D synchronization signal;

physical resources for transmitting a D2D discovery signal; and physical resources for transmitting a D2D communication signal.

Preferably the D2D signal is one of:

a D2D synchronization signal;

a D2D discovery signal; and a D2D communication signal.

An embodiment of the application provides another UE including a processor and a memory, wherein the processor is configured with a computer program for performing the method performed by the UE at the sending side according to the embodiment above of the application; the memory is configured to store the computer program to configure the processor; and the processor includes a baseband processing component, a radio frequency processing component, and other components as needed in reality, which are configured to transmit related information, wherein:

the processor is configured to determine a resource hopping pattern between a plurality of D2D transmission physical resources of the UE, according to the preset D2D parameter; to determine the D2D transmission physical resources according to the resource hopping pattern; and to send a D2D signal over the determined D2D transmission physical resources.

Preferably the processor is configured to determine a resource hopping pattern in frequency domain between the D2D transmission physical resources of the UE, according to the preset D2D parameter; or to determine a resource hopping pattern in time domain between the D2D transmission physical resources of the UE, according to the preset D2D parameter; or to determine a resource hopping pattern in frequency domain between the D2D transmission physical resources of the UE, according to the preset D2D parameter, and to determine a resource hopping pattern in time domain between the D2D transmission physical resources of the UE, according to the resource hopping pattern in frequency domain; or to determine a resource hopping pattern in time domain between the D2D transmission physical resources of the UE, according to the preset D2D parameter, and to determine a resource hopping pattern in frequency domain between the D2D transmission physical resources of the UE, according to the resource hopping pattern in time domain.

Preferably the processor is configured to determine an initial D2D transmission physical resource by selecting the resource randomly, or measuring interference over candidate resources, or according to resource configuration information indicated by the network side or the other UE; and to determine the other D2D transmission physical resources according to the resource hopping pattern, and the initial D2D transmission physical resource.

An embodiment of the application provides a UE including:

a first D2D transmission physical resource determining unit 21 is configured to determine a first D2D transmission physical resource for transmitting a D2D signal of a first UE in D2D communication with the UE;

a D2D parameter determining unit configured to determine a D2D parameter of the first UE;

a second resource hopping pattern determining unit configured to determine a resource hopping pattern between a plurality of D2D transmission physical resources of the first UE according to the D2D parameter of the first UE;

a second D2D transmission physical resource determining unit configured to determine the D2D transmission physical resources over which the first UE transmits the D2D signal, according to the first D2D transmission physical resource, and the determined resource hopping pattern; and a D2D signal detecting unit configured to detect the D2D signal of the first UE over the D2D transmission physical resources over which the first UE transmits the D2D signal.

With this UE, the UE determines the resource hopping pattern between the different D2D transmission physical resources of the opposite UE in D2D communication therewith according to the D2D parameter of the opposite UE to thereby obtain the D2D transmission physical resources of the opposite UE, and further receives the D2D signal of the opposite UE, so that the UEs transmitting the D2D signals in the same sub-frame at any instance of time can transmit the D2D signal in different sub-frames during the subsequent transmission, thus improving the overall performance of transmitting the D2D signals in the system. Moreover the receiving UE can know from the D2D transmission physical resource over which the D2D signal is detected at any instance of time, the D2D transmission physical resource over which the UE sending the D2D signal sends the D2D signal at the next instance of time, and thus can subsequently simply detect the D2D signal over the corresponding D2D transmission physical resource, thus decreasing the complexity at which the UE detects the D2D signal.

Preferably the first D2D transmission physical resource determining unit is configured:

to detect the D2D signal of the first UE, and to determine a physical resource over which the D2D signal of the first UE is detected, as the first D2D transmission physical resource; or to determine the first D2D transmission physical resource over which the D2D signal of the first UE is transmitted, according to an indicator of the network side or the other UE.

Preferably the D2D parameter determining unit is configured:

to obtain the D2D parameter of the first UE from the D2D signal detected over the first D2D transmission physical resource; or to determine the D2D parameter of the first UE as a prescribed parameter; or to determine the D2D parameter of the first UE from an indicator of the network side or the other UE.

Preferably the second resource hopping pattern determining unit is configured:

to determine a resource hopping pattern in frequency domain between the D2D transmission physical resources of the first UE, according to the D2D parameter of the first UE; or to determine a resource hopping pattern in time domain between the D2D transmission physical resources of the first UE, according to the D2D parameter of the first UE; or to determine a resource hopping pattern in frequency domain between the D2D transmission physical resources of the first UE, according to the D2D parameter of the first UE, and to determine a resource hopping pattern in time domain between the D2D transmission physical resources of the first UE, according to the resource hopping pattern in frequency domain; or to determine a resource hopping pattern in time domain between the D2D transmission physical resources of the first UE, according to the D2D parameter of the first UE, and to determine a resource hopping pattern in frequency domain between the D2D transmission physical resources of the first UE, according to the resource hopping pattern in time domain.

Preferably the UE further includes:

a first resource hopping pattern determining unit configured to determine a resource hopping pattern between a plurality of D2D transmission physical resources of the UE, according to a preset D2D parameter;

a first D2D transmission physical resource determining unit configured to determine the D2D transmission physical resources according to the resource hopping pattern determined by the first resource hopping pattern determining unit; and a D2D signal sending unit configured to send a D2D signal over the D2D transmission physical resources determined by the first D2D transmission physical resource determining unit.

An embodiment of the application provides another UE including: a processor and a memory, wherein the processor is configured with a computer program for performing the method performed by the UE at the receiving side according to the embodiment above of the application; the memory is configured to store the computer program to configure the processor; and the processor can include a baseband processing component, a radio frequency processing component, and other components as needed in reality, which are configured to transmit related information, wherein:

the processor is configured to determine a first D2D transmission physical resource for transmitting a D2D signal of a first UE in D2D communication with the UE; to determine a D2D parameter of the first UE; to determine a resource hopping pattern between a plurality of D2D transmission physical resources of the first UE according to the D2D parameter of the first UE; to determine the D2D transmission physical resources over which the first UE transmits the D2D signal, according to the first D2D transmission physical resource, and the determined resource hopping pattern; and to detect the D2D signal of the first UE over the D2D transmission physical resources over which the first UE transmits the D2D signal.

Preferably the processor is configured to detect the D2D signal of the first UE, and to determine a physical resource over which the D2D signal of the first UE is detected, as the first D2D transmission physical resource; or to determine the first D2D transmission physical resource for transmitting the D2D signal of the first UE, according to an indicator of the network side or the other UE.

Preferably the processor is configured to obtain the D2D parameter of the first UE from the D2D signal detected over the first D2D transmission physical resource; or to determine the D2D parameter of the first UE from an indicator of the network side or the other UE.

Preferably the processor is configured to determine a resource hopping pattern in frequency domain between the D2D transmission physical resources of the first UE, according to the D2D parameter of the first UE; or to determine a resource hopping pattern in time domain between the D2D transmission physical resources of the first UE, according to the D2D parameter of the first UE; or to determine a resource hopping pattern in frequency domain between the D2D transmission physical resources of the first UE, according to the D2D parameter of the first UE, and to determine a resource hopping pattern in time domain between the D2D transmission physical resources of the first UE, according to the resource hopping pattern in frequency domain; or to determine a resource hopping pattern in time domain between the D2D transmission physical resources of the first UE, according to the D2D parameter of the first UE, and to determine a resource hopping pattern in frequency domain between the D2D transmission physical resources of the first UE, according to the resource hopping pattern in time domain.

Preferably the processor is further configured to perform the functions of the processor at the sending side, that is, further configured:

to determine a resource hopping pattern between a plurality of D2D transmission physical resources of the UE, according to a preset D2D parameter;

to determine the D2D transmission physical resources according to the determined resource hopping pattern; and to send a D2D signal over the determined D2D transmission physical resources.

DETAILED DESCRIPTION OF THE EMBODIMENTS

Embodiments of the application provide a D2D signal transmission method and device so that a UE determines a resource hopping pattern between different D2D transmission physical resources according to its own D2D parameter to thereby be provided with the D2D transmission physical resources, so the D2D UEs transmitting the D2D signals in the same sub-frame at any instance of time can subsequently transmit the D2D signals in different sub-frames, thus improving the overall performance of D2D transmission in the system.

Figure 1:
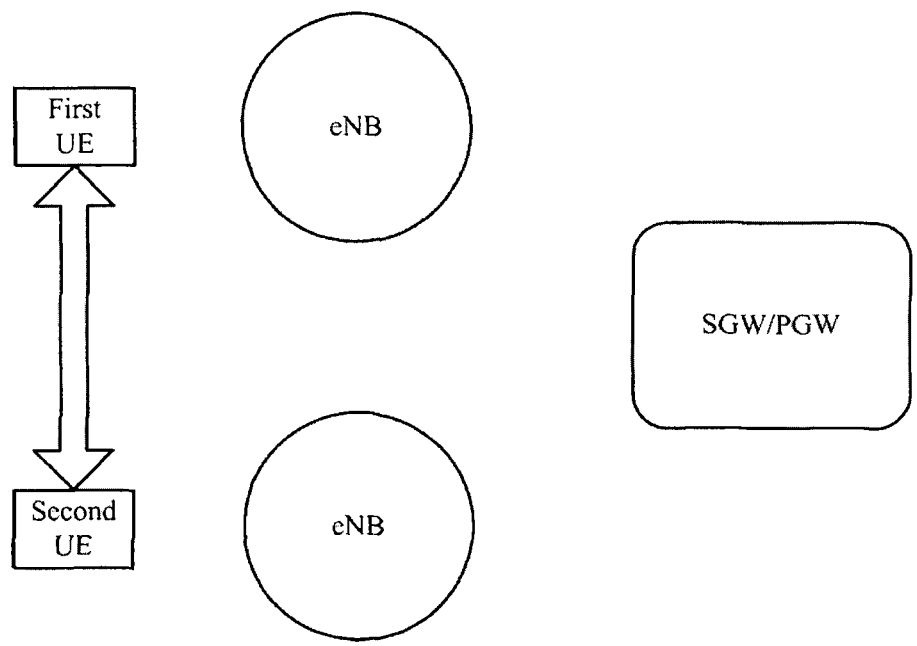
FIG. 1 is a schematic data flow chart of direct communication between UEs in the prior art.
Figure 2:
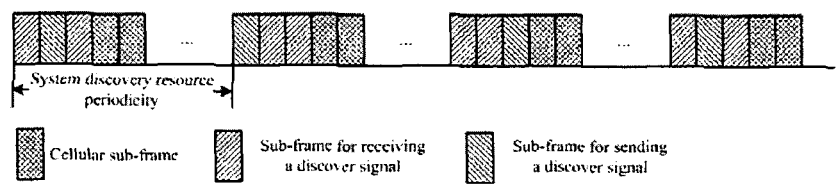
FIG. 2 is a schematic diagram of discovery resources of a UE in the prior art.
Figure 3:
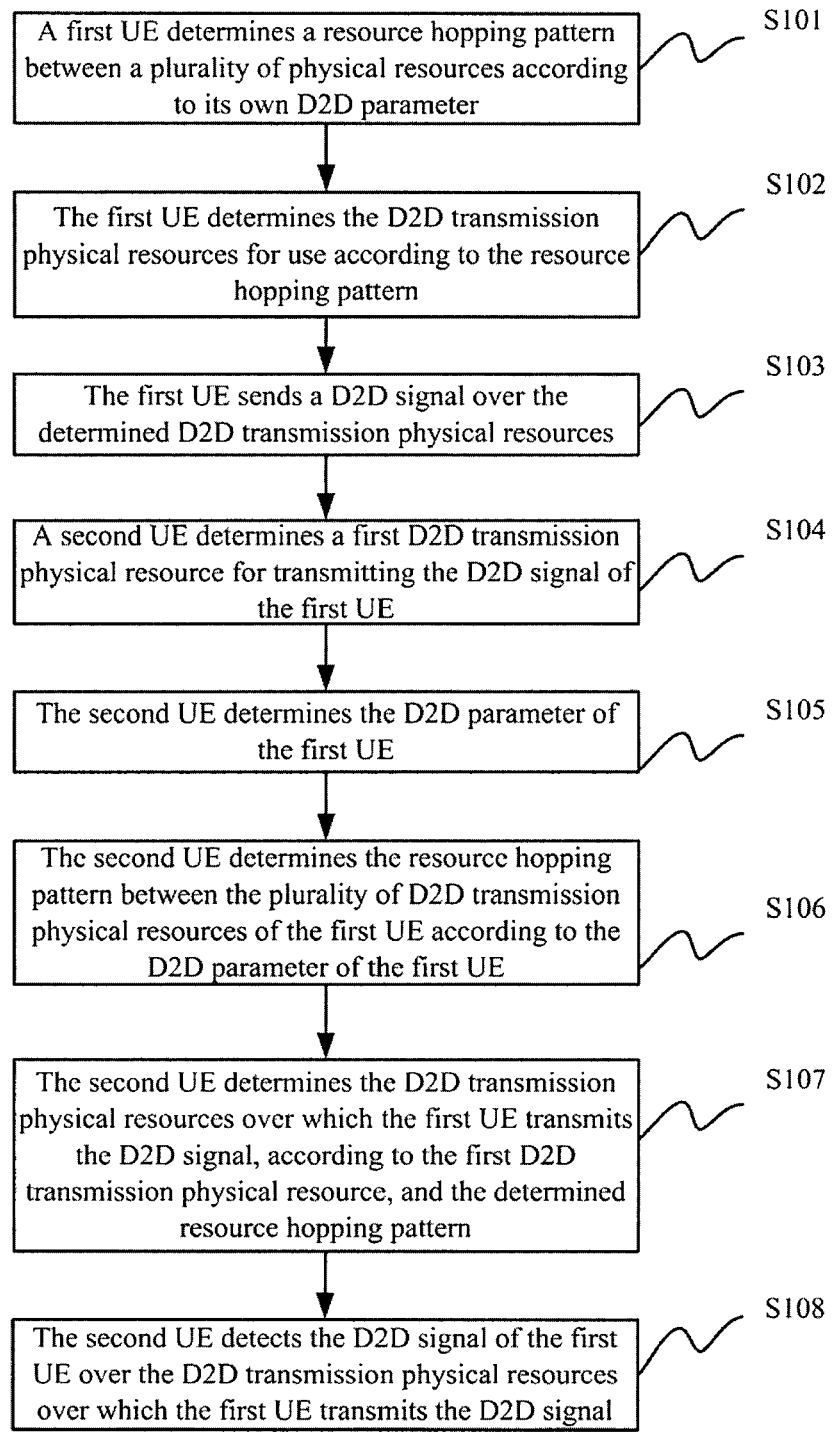
FIG. 3 is a schematic flow chart of a D2D signal transmission method according to an embodiment of the application.

An embodiment of the application provides a method for sending a D2D signal as illustrated in FIG. 3, which particularly includes the following operations:

S101. A first UE determines a resource hopping pattern between a plurality of D2D transmission physical resources of the first UE, including a frequency and/or resource hopping pattern in time domain, according to its own D2D parameter.

The D2D parameter includes any one of the following parameters:

A hopping index of the first UE pre-configured by the network side via higher-layer signaling;

A D2D identifier (ID) of the first UE;

A D2D ID of a target UE for the first UE;

A D2D application ID of the first UE;

A D2D application user ID of the first UE;

A D2D application user ID of the target UE for the first UE;

A D2D device ID of the first UE;

A D2D device ID of the target UE for the first UE;

An IP address of the first UE;

An IP address of the target UE for the first UE;

Global Positioning System (GPS) location information of the first UE;

A broadcast ID of the first UE;

Information carried in the D2D signal transmitted by the first UE; and

A D2D hopping configuration parameter of the first UE.

Where the D2D parameter applied to the first UE can be pre-configured by the network side.

Where the D2D hopping configuration parameter is a specific parameter for obtaining a hopping pattern for transmission of a D2D signal, which includes one or more configuration parameters in a corresponding hopping formula, and the value of which lies in a prescribed range configured by the network side, or pre-configured in the UE. In an implementation of the application, P in the hopping formula represents the D2D parameter, which can be a specific D2D hopping configuration parameter. For example, the value of P lies in {0, 1, . . . , 10}, and particularly configured by the network side independent of the other D2D parameters of the UE.

Where the D2D parameter applied to the first UE is prescribed between the first UE and a second UE, or subsequently indicated by the network side or the other UE to the second UE. For example, the D2D parameter can be a source identifier (ID), a Proximity Service Identifier (ProSe ID), a Proximity Application Identifier (Prose Application ID), or a Proximity Application User Identifier (ProSe App User ID) of the first UE, or can be a target identifier (ID), a Proximity Service Identifier (ProSe ID), a ProSe Application ID, or a Prose App User ID of the target UE for the first UE (i.e., the second UE). Moreover the D2D parameter can alternatively be a hopping index pre-configured by the network side for the first UE via higher-layer signaling, where the hopping index determines the index of the hopping pattern among candidate hopping patterns, and determines the hopping pattern of the UE together with the other parameters. In one word, the first UE and the second UE in D2D communication selects the same D2D parameter of the first UE.

In a first approach, the first UE determines the resource hopping pattern according to the D2D parameter as follows: the first UE determines the resource hopping pattern in frequency domain according to the D2D parameters.

For example, if the value of the D2D parameter is P, and the number of frequency resources available to each D2D transmission physical resource is nRB, then the index of a frequency resource occupied by a D2D transmission physical resource with the index i in the resource hopping pattern in frequency domain can be represented as:

$PRB(i)=P \bmod nRB$; or $PRB(i)=[PRB(i-1)+P] \bmod nRB$; or $PRB(i)=[PRB(0)+i*P] \bmod nRB$; or $PRB(i)=[PRB(i-1)+f(P)] \bmod nRB$; or $PRB(i)=[PRB(i-1)+f(P,i)] \bmod nRB$.

Where f(P) represents a function or sequence including the parameter P, for example, a pseudorandom sequence C is derived taking a function of P as an initial value, and further the hopping pattern f(P) is derived from C; and f(P,i) represents a function or sequence including the parameters P and i, for example, a pseudorandom sequence C(i) is derived taking a function of P as an initial value, and further the hopping pattern f(P,i) is derived from C(i), the value of i is any natural number.

With the formula above, generally, different resource hopping pattern in frequency domains can be derived as long as there are different D2D parameters of different D2D UEs, so that the UEs with conflicting frequency resources can occupy different frequency resources in subsequent transmission.

One of the formulas (i.e., rules) to be applied is prescribed between the first UE and the second UE.

In a second approach, the first UE determines the resource hopping pattern according to the D2D parameter as follows: the first UE determines the resource hopping pattern in time domain according to the D2D parameters.

For example, if the value of the D2D parameter is P, and the number of time resources available to each D2D transmission physical resource is nSF, then the index of a time resource occupied by a D2D transmission physical resource with the index i in the resource hopping pattern in time domain can be represented as:

$SF(i)=P \bmod nSF$; or $SF(i)=[SF(i-1)+P] \bmod nSF$; or $SF(i)=[SF(0)+i*P] \bmod nSF$; or $SF(i)=[SF(0)+i*PRB(0)+i*(i-1)*P/2] \bmod nSF$; or $SF(i)=[SF(i-1)+f(P)] \bmod nSF$; or $SF(i)=[SF(i-1)+f(P,i)] \bmod nSF$.

With the formula above, generally, different resource hopping pattern in time domains can be derived as long as there are different D2D parameters of different D2D UEs, so that the UEs transmitting over the same time resource can occupy different time resources in the subsequent transmission, to thereby receive the D2D signal of the other UE.

One of the formulas (i.e., rules) to be applied is prescribed between the first UE and the second UE.

In a third approach, the first UE determines the resource hopping pattern according to the D2D parameter as follows: the first UE determines the resource hopping pattern in frequency domain according to the D2D parameters, and further determines the resource hopping pattern in time domain according to the determined resource hopping pattern in frequency domain.

For example, if the value of the D2D parameter is P, and the number of frequency resources available to each D2D transmission physical resource is nRB, and the number of time resources available thereto is nSF, then the index of a frequency resource occupied by a D2D transmission physical resource with the index i in the resource hopping pattern in frequency domain can be represented as:

$PRB(i)=P \bmod nRB$; or $PRB(i)=[PRB(i-1)+P] \bmod nRB$; or $PRB(i)=[PRB(0)+i*P] \bmod nRB$; or $PRB(i)=[PRB(i-1)+f(P)] \bmod nRB$; or $PRB(i)=[PRB(i-1)+f(P,i)] \bmod nRB$.

The index of a time resource occupied by the D2D transmission physical resource with the index i can be represented as:

$SF(i)=[SF(i-1)+PRB(i-1)] \bmod nSF$; or $SF(i)=[SF(0)+i*PRB(0)+i*(i-1)*P/2] \bmod nSF$.

One of the formulas (i.e., rules) to be applied is prescribed between the first UE and the second UE.

With the formula above, generally, different resource hopping pattern in frequency domains can be derived as long as there are different D2D parameters of different D2D UEs, so that the UEs having transmission in the same time and frequency resource can occupy different frequency resources in the subsequent transmission; while the UEs occupying the same time resource but different frequency resources can occupy different time resources in the subsequent transmission due to the resource hopping pattern in time domain, to thereby receive the D2D signal of the other UE.

In a fourth approach, the first UE determines the resource hopping pattern according to the D2D parameter as follows: the first UE determines the resource hopping pattern in time domain between a plurality of D2D transmission physical resources of the first UE, according to the preset D2D parameter, and then determines the resource hopping pattern in frequency domain between the number of D2D transmission physical resources of the first UE, according to the resource hopping pattern in time domain.

The D2D transmission physical resources as mentioned in the embodiment of the application can be D2D discovery resources for the D2D discovery signal transmission, or can be D2D communication resources for the D2D communication signal transmission, or D2D synchronization resources for the D2D synchronization signal transmission.

S102. The first UE determines the physical resources to be used for D2D transmission according to the resource hopping pattern, particularly as follows:

In a first approach, the first UE determines an initial D2D transmission physical resource by selecting the resource randomly; and further determines the other D2D transmission physical resources according to the resource hopping pattern, and the initial D2D transmission physical resource.

For example, the first UE selects one of the nRB frequency resources randomly as PRB(0), and one of the nSF time resources randomly as SF(0), and further determines a frequency resource index PRB(i) and a time resource index SF(i) of a D2D transmission physical resource with the index i according to the resource hopping pattern.

Alternatively in a second approach, the first UE determines an initial D2D transmission physical resource according to resource configuration information indicated by the network side or the other UE; and further determines the other D2D transmission physical resources according to the resource hopping pattern, and the initial D2D transmission physical resource.

For example, the first UE obtains PRB(0) and SF(0) from the resource configuration information indicated by the network side or the other UE, and further determines a frequency resource index PRB(i) and a time resource index SF(i) of a D2D transmission physical resource with the index i according to the resource hopping pattern.

Alternatively in a third approach, the first UE determines an initial D2D transmission physical resource by measuring interference over candidate resources; and further determines the other D2D transmission physical resources according to the resource hopping pattern, and the initial D2D transmission physical resource.

For example, the first UE measures interferences over all the candidate D2D transmission physical resources, and selects one of the D2D transmission physical resources with lower interference as the initial D2D transmission physical resource.

S103. The first UE sends a D2D signal over the determined D2D transmission physical resources.

Preferably the D2D signal carries the D2D parameter for determining the resource hopping pattern by the first UE; and The D2D signal can be a D2D discovery signal, or can be a D2D communication signal or a D2D synchronization signal.

It shall be noted that the D2D transmission physical resources as mentioned in the embodiment of the application can be physical resources over which the UE really transmits the D2D signal, or can be physical resources over which the UE can transmit the D2D signal (but the UE may not transmit the D2D signal). Alike the UE transmits the D2D signal over the determined D2D transmission physical resources, but the UE may not transmit the D2D signal over all the determined D2D transmission physical resources, and instead the UE may transmit the D2D signal over only a part of the determined D2D transmission physical resources.

S104. A second UE determines a first D2D transmission physical resource for transmitting the D2D signal of the first UE.

Where the second UE determines the first D2D transmission physical resource particular as follows:

The first D2D transmission physical resource is indicated by the network side or the other UE to the second UE; or the first D2D transmission physical resource is determined by the second UE detecting the D2D signal blindly, that is, the second UE determines a physical resource over which the D2D signal is detected, as the first D2D transmission physical resource.

Here the D2D signal of the first UE, detected by the second UE over the first D2D transmission physical resource, carries the D2D parameter for determining the resource hopping pattern by the first UE.

S105. The second UE determines the D2D parameter of the first UE.

Where the D2D parameter of the first UE sending the D2D signal can be a parameter prescribed between the second UE and the first UE, or determined from the information carried in the D2D signal, or indicated by the network side or the other UE to the second UE, where the parameter prescribed between the second UE and the first UE can be the D2D ID, the D2D device ID, the D2D application ID, or the D2D application user ID of the second UE, or the IP address of the second UE, e.g., the source ID, the ProSe ID, the ProSe Application ID, or the ProSe App user ID of the second UE.

S106. The second UE determines the resource hopping pattern between the D2D transmission physical resources of the first UE according to the D2D parameter of the first UE.

In an embodiment of the application, the first UE and the second UE in D2D communication apply the same formula (referred to as the same rule) from which the resource hopping pattern of each other is determined.

S107. The second UE determines the D2D transmission physical resources over which the first UE transmits the D2D signal, according to the first D2D transmission physical resource, and the determined resource hopping pattern.

S108. The second UE detects the D2D signal of the first UE over the D2D transmission physical resources over which the first UE transmits the D2D signal.

Figure 4:
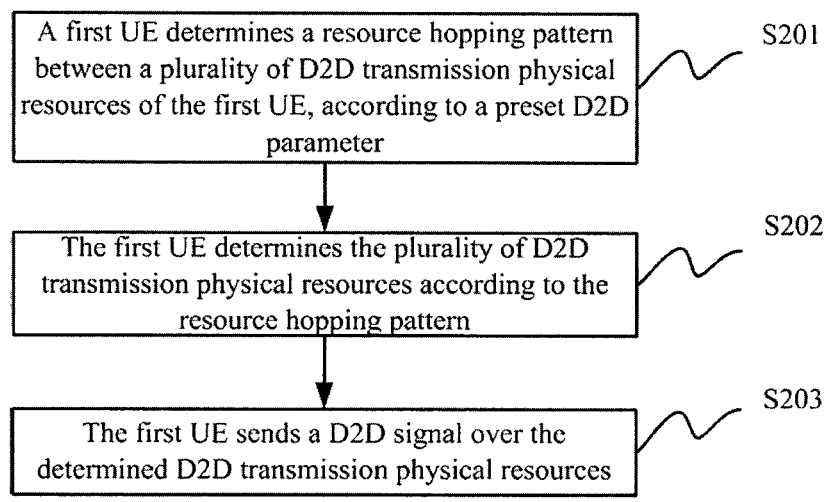
FIG. 4 is a schematic flow chart of a method for sending a D2D signal according to an embodiment of the application.

As can be apparent, referring to FIG. 4, an embodiment of the application provides a method for sending a D2D signal at the sending side, which particularly includes:

S201. A first UE determines a resource hopping pattern between a plurality of D2D transmission physical resources of the first UE, according to a preset D2D parameter;

S202. The first UE determines the D2D transmission physical resources according to the resource hopping pattern; and S203. The first UE sends a D2D signal over the determined D2D transmission physical resources.

Figure 5:
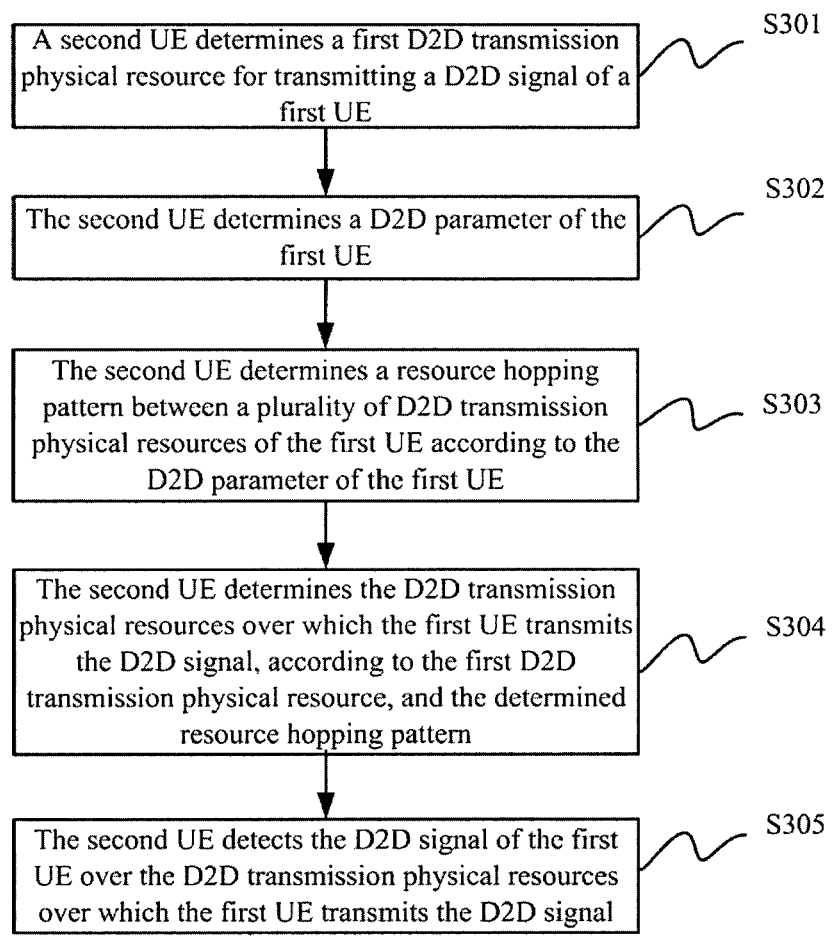
FIG. 5 is a schematic flow chart of a method for receiving a D2D signal according to an embodiment of the application.

Correspondingly referring to FIG. 5, an embodiment of the application provides a method for receiving a D2D signal at the receiving side, which particularly includes:

S301. A second UE determines a first D2D transmission physical resource for transmitting a D2D signal of a first UE;

S302. The second UE determines a D2D parameter of the first UE;

S303. The second UE determines a resource hopping pattern between a plurality of D2D transmission physical resources of the first UE according to the D2D parameter of the first UE;

S304. The second UE determines the D2D transmission physical resources over which the first UE transmits the D2D signal, according to the first D2D transmission physical resource, and the determined resource hopping pattern; and S305. The second UE detects the D2D signal of the first UE over the D2D transmission physical resources over which the first UE transmits the D2D signal.

Several particular embodiments will be described below by way of an example.

First Embodiment

A UE 1 and a UE 2 determine resource hopping patterns of discovery resources over which discovery signals are sent in different system discovery resource periodicities (i.e., periodicities of resource areas in which the UEs send the discovery signals) according to their own D2D device IDs (for example, the values of the IDs are P1=2 and P2=53 respectively). Particularly if the number of frequency resources available in each system discovery resource periodicity is nRB, and the number of time resources available therein is nSF, then the index of a resource occupied by the UE 1 in a system discovery resource periodicity with the index i will be:

A frequency resource index is PRB(i)=[PRB(0)+i*P1] mod nRB, and

A time resource index is SF(i)=[SF(0)+i*PRB(0)+i*(i−1)*P2/2] mod nSF; and

The index of a resource occupied by the UE 2 will be:

The index of a frequency resource is PRB(i)=[PRB(0)+i*P2] mod nRB, and

The index of a time resource is SF(i)=[SF(0)+i*PRB(0)+i*(i−1)*P2/2] mod nSF;

The UE 1 and the UE 2 determines their applicable discovery resources according to the resource hopping patterns. Particularly the UE 1 and the UE 2 respectively select one of the nRB=50 frequency resources randomly as PRB(0), and one of the nSF=10 time resources randomly as SF(0), and further determine a frequency resource index PRB(i) and a time resource index SF(i) of a discovery resource for sending the discovery signal in the system discovery resource periodicity with the index i, according to the resource hopping patterns.

If the UE 1 selects PRB(0)=0 and SF(0)=2, and the UE 2 selects PRB(0)=3 and SF(0)=2, that is, they select different frequency resources in the same sub-frame, then there are PRB(1)=P1 mod 50=2, and SF(1)=2 for the UE 1, and PRB(1)=(3+P2) mod 50=6, and SF(1)=5 for the UE 2 in the second discovery resource periodicity, that is, their discovery resources are in different sub-frames; and If the UE 1 selects PRB(0)=0 and SF(0)=2, and the UE 2 selects PRB(0)=0 and SF(0)=2, that is, they select the same frequency resource in the same sub-frame, then there are PRB(1)=P1 mod 50=2, and SF(1)=2 for the UE 1, and PRB(1)=P2 mod 50=3, and SF(1)=2 for the UE 2 in the second discovery resource periodicity, that is, their discovery resources are different frequency resources in the same sub-frame, so that there are PRB(2)=4, and SF(2)=4 for the UE 1, and PRB(2)=6, and SF(2)=5 for the UE 2 in the second discovery resource periodicity, that is, their discovery resources are in different sub-frames.

The UE 1 and the UE 2 respectively send the discovery signals over the discovery resources determined in each system discovery resource periodicity, and detect the discovery signals of the other UEs in the other sub-frames than the sub-frames in which the discovery signals are sent in the system discovery resource periodicity. The first UE and the second UE transmit the discovery signals in the same sub-frame in the first and second discovery resource periodicities of the UE, so they can not discover each other; but the first UE and the second UE transmit in different sub-frames in the third discovery resource periodicity of the UE, so they can discover each other.

Second Embodiment

A second UE is a discovering UE, and a first UE is a target UE of the second UE, where the second UE discovers the first UE by detecting a discovery signal of the first UE.

The first UE determines a resource hopping pattern of discovery resources over which a discovery signal is sent in different system discovery resource periodicities according to its own D2D application ID (for example, the value of the ID is P). Particularly if the number of frequency resources available in each system discovery resource periodicity is nRB, and the number of time resources available therein is nSF, then the index of a resource occupied by the first UE in a system discovery resource periodicity with the index i will be:

A frequency resource index is $PRB(i)=[PRB(i-1)+f(P,i)]\ mod\ nRB$, and

A time resource index is $SF(i)=[SF(i-1)+PRB(i-1)]\ mod\ nSF$,

Where $f(P,i)=c(i)$, where $c(i)$ represents a pseudorandom sequence, which is initialized by $C_{int}=P\ mod\ nRB$ in the first system discovery resource periodicity;

The first UE determines its applicable discovery resources according to the resource hopping pattern. Particularly the first UE receives discovery resource configuration information from the network side, and determines an initial discovery resource configuration; and further determines a frequency resource index $PRB(i)$ and a time resource index $SF(i)$ of a discovery resource with the index i, according to the resource hopping patterns. For example, the first UE obtains $PRB(0)$ and $SF(0)$ from configuration information of D2D transmission physical resources indicated by the network side, and further determine a frequency resource index $PRB(i)$ and a time resource index $SF(i)$ of a discovery resource over which the discovery signal is sent in the system discovery resource periodicity with the index i, according to the resource hopping pattern. Since there are different values of P for the different UEs, different pseudorandom sequences $c(i)$ can be derived, thus achieving the effect of randomizing the frequency resource.

The first UE sends the discovery signal over the discovery resources determined in each system discovery resource periodicity, where the discovery signal carries the D2D application ID (P) for determining the resource hopping pattern by the first UE; and The second UE detects the discovery signal of the first UE over the respective discovery resources in the system discovery resource periodicity, where the discovery signal of the first UE is detected over certain discovery resource (PRB(k), SF(k)), and obtains the D2D application ID (P) for determining the resource hopping pattern by the first UE, from the detected discovery signal.

The second UE determines the resource hopping pattern of discovery resources over which the first UE sends the discovery signal in different system discovery resource periodicities, according to the D2D application ID, where the resource hopping pattern is determined as done by the first UE above:

A frequency resource index is $PRB(i)=[PRB(i-1)+P]\ mod\ nRB$, and

A time resource index is $SF(i)=[SF(i-1)+PRB(i-1)]\ mod\ nSF$;

The second UE determines the discovery resources over which the first UE sends the discovery signal in the respective subsequent system discovery resource periodicities, according to the discovery resource (PRB(k), SF(k)) over which the discovery signal of the first UE is detected, and the determined resource hopping pattern; and The second UE detects the discovery signal of the first UE over the discovery resources determined in the respective subsequent system discovery resource periodicities.

Third Embodiment

For example, a first UE is a sending UE in D2D communication, and a second UE is a receiving UE in D2D communication.

The first UE determines a resource hopping pattern between a plurality of D2D communication resources over which the first UE sends a D2D communication signal, according to its own D2D broadcast ID (for example, the value of the ID is P). Particularly if the number of frequency resources available for each D2D communication signal transmission is nRB, and the number of time resources available therefor is nSF, then the index of a resource occupied by the communication signal transmission with the index i will be:

A frequency resource index is $PRB(i)=[PRB(i-1)+P]\ mod\ nRB$, and

A time resource index is $SF(i)=[SF(i-1)+PRB(i-1)]\ mod\ nSF$;

The first UE determines the D2D communication resources for sending the D2D communication signal by the first UE, according to the resource hopping pattern. Particularly the first UE selects one of the nRB frequency resources randomly as $PRB(0)$, and one of the nSF time resources randomly as $SF(0)$, and further determines a frequency resource index $PRB(i)$ and a time resource index $SF(i)$ of a D2D communication resource occupied by the D2D communication signal transmission with the index i, according to the resource hopping pattern. The particular effect is the same to the first embodiment.

The first UE sends the D2D communication signal over the determined D2D communication resources, where the D2D communication signal carries the D2D broadcast ID for determining the resource hopping pattern by the first UE;

The second UE detects the D2D communication signal of the first UE over the respective D2D communication resources, where the D2D communication signal of the first UE is detected over certain D2D communication resource (PRB(k), SF(k)), and obtains the D2D broadcast ID for determining the resource hopping pattern by the first UE, from the detected D2D communication signal;

The second UE determines the resource hopping pattern of the D2D communication resources over which the first UE sends the D2D communication signal, according to the D2D broadcast ID, where the resource hopping pattern is determined as done by the first UE above;

The second UE determines the other D2D communication resources over which the first UE transmits the D2D communication signal, according to the D2D communication resource (PRB(k), SF(k)) over which the D2D communication signal of the first UE is detected, and the determined resource hopping pattern; and The second UE detects the D2D communication signal of the first UE over the determined D2D communication resources.

In correspondence to the method above, devices according to embodiments of the application will be introduced below.

Figure 6:
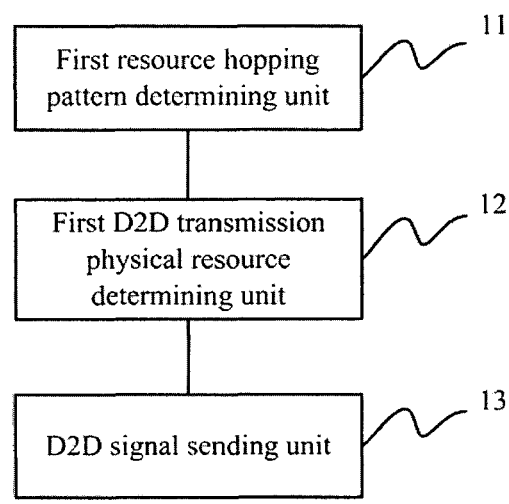
FIG. 6 is a schematic structural diagram of a UE at the sending side according to an embodiment of the application.

Referring to FIG. 6, an embodiment of the application provides a UE, where the UE includes:

A first resource hopping pattern determining unit 11 is configured to determine a resource hopping pattern between a plurality of D2D transmission physical resources of the UE, according to a preset D2D parameter;

A first D2D transmission physical resource determining unit 12 is configured to determine the D2D transmission physical resources according to the resource hopping pattern; and A D2D signal sending unit 13 is configured to send a D2D signal over the determined D2D transmission physical resources.

Preferably the D2D parameter includes any one of the following parameters:

A hopping index of the first UE pre-configured by the network side via higher-layer signaling;
A D2D identifier (ID) of the first UE;
A D2D ID of a target UE of the first UE;
A D2D application ID of the first UE;
A D2D application user ID of the first UE;
A D2D application user ID of the target UE of the first UE;
A D2D device ID of the first UE;
A D2D device ID of the target UE of the first UE;
An IP address of the first UE;
An IP address of the target UE of the first UE;
Global Positioning System (GPS) location information of the first UE;
A broadcast ID of the first UE;
Information carried in the D2D signal transmitted by the first UE; and
A D2D hopping configuration parameter of the first UE.

Preferably the D2D parameter can be pre-configured by the network side.

Preferably the first resource hopping pattern determining unit 11 is configured:

To determine a resource hopping pattern in frequency domain between the D2D transmission physical resources of the UE, according to the preset D2D parameter; or To determine a resource hopping pattern in time domain between the D2D transmission physical resources of the UE, according to the preset D2D parameter; or To determine a resource hopping pattern in frequency domain between the D2D transmission physical resources of the UE, according to the preset D2D parameter, and to determine a resource hopping pattern in time domain between the D2D transmission physical resources of the UE, according to the resource hopping pattern in frequency domain; or To determine a resource hopping pattern in time domain between the D2D transmission physical resources of the UE, according to the preset D2D parameter, and to determine a resource hopping pattern in frequency domain between the D2D transmission physical resources of the UE, according to the resource hopping pattern in time domain.

Preferably the first D2D transmission physical resource determining unit 12 is configured:

To determine an initial D2D transmission physical resource by selecting the resource randomly, or measuring interference over candidate resources, or according to resource configuration information indicated by the network side or the other UE; and To determine the other D2D transmission physical resources according to the resource hopping pattern, and the initial D2D transmission physical resource.

Preferably the D2D signal includes the D2D parameter.

Preferably the D2D transmission physical resources are particularly one of:

Physical resources for transmitting a D2D synchronization signal;
Physical resources for transmitting a D2D discovery signal; and
Physical resources for transmitting a D2D communication signal.

Preferably the D2D signal is particularly one of:

A D2D synchronization signal;
A D2D discovery signal; and
A D2D communication signal.

Figure 7:
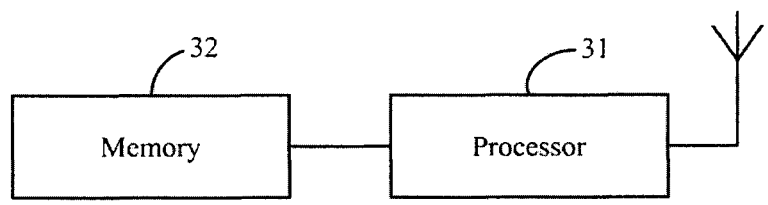
FIG. 7 is a schematic structural diagram of another UE at the sending side according to an embodiment of the application.

Referring to FIG. 7, an embodiment of the application further provides another UE at the sending side, where the UE includes a processor 31 and a memory 32, where the processor 31 is configured with a computer program for performing the method performed by the UE at the sending side according to the embodiment above of the application; the memory 32 is configured to store the computer program to configure the processor 31; and the processor 31 can include a baseband processing component, a radio frequency processing component, and other components as needed in reality, which are configured to transmit related information. Particularly:

The processor 31 is configured to determine a resource hopping pattern between a plurality of D2D transmission physical resources of the UE, according to a preset D2D parameter; to determine the D2D transmission physical resources according to the resource hopping pattern; and to send a D2D signal over the determined D2D transmission physical resources.

Preferably the processor 31 is configured to determine a resource hopping pattern in frequency domain between the D2D transmission physical resources of the UE, according to the preset D2D parameter; or to determine a resource hopping pattern in time domain between the D2D transmission physical resources of the UE, according to the preset D2D parameter; or to determine a resource hopping pattern in frequency domain between the D2D transmission physical resources of the UE, according to the preset D2D parameter, and to determine a resource hopping pattern in time domain between the D2D transmission physical resources of the UE, according to the resource hopping pattern in frequency domain; or to determine a resource hopping pattern in time domain between the D2D transmission physical resources of the UE, according to the preset D2D parameter, and to determine a resource hopping pattern in frequency domain between the D2D transmission physical resources of the UE, according to the resource hopping pattern in time domain.

Preferably the processor 31 is configured to determine an initial D2D transmission physical resource by selecting the resource randomly, or measuring interference over candidate resources, or according to resource configuration information indicated by the network side or the other UE; and to determine the other D2D transmission physical resources according to the resource hopping pattern, and the initial D2D transmission physical resource.

Figure 8:
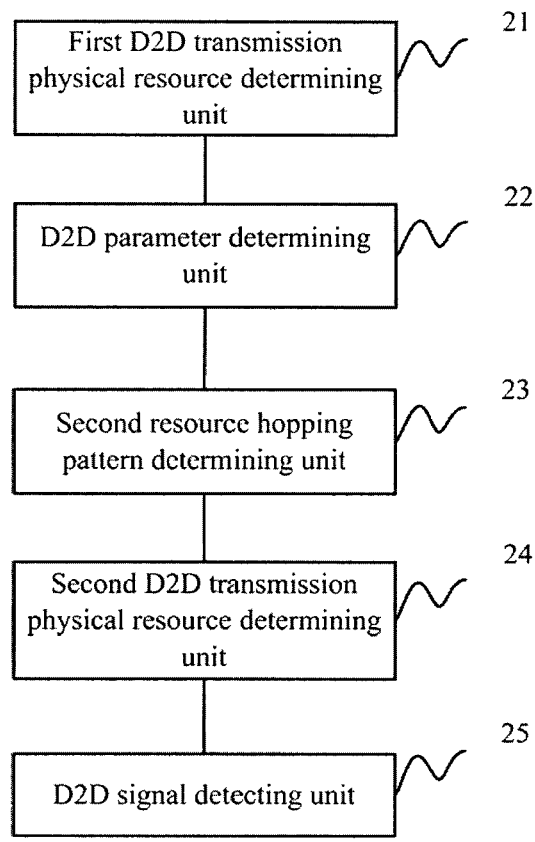
FIG. 8 is a schematic structural diagram of a UE at the receiving side according to an embodiment of the application.

Referring to FIG. 8, an embodiment of the application provides a UE at the receiving side, where the UE provides:

A first D2D transmission physical resource determining unit 21 is configured to determine a first D2D transmission physical resource for the D2D signal of a first UE in D2D communication with the UE;

A D2D parameter determining unit 22 is configured to determine a D2D parameter of the first UE;

A second resource hopping pattern determining unit 23 is configured to determine a resource hopping pattern between a plurality of physical resources of the first UE according to the D2D parameter of the first UE;

A second D2D transmission physical resource determining unit 24 is configured to determine the D2D transmission physical resources over which the first UE transmits the D2D signal, according to the first D2D transmission physical resource, and the determined resource hopping pattern; and A D2D signal detecting unit 25 is configured to detect the D2D signal of the first UE over the D2D transmission physical resources over which the first UE transmits the D2D signal.

Preferably the first D2D transmission physical resource determining unit 21 is configured:

To detect the D2D signal of the first UE, and to determine a physical resource over which the D2D signal of the first UE is detected, as the first D2D transmission physical resource; or To determine the first D2D transmission physical resource for transmitting the D2D signal of the first UE, according to an indicator of the network side or the other UE.

Preferably the D2D parameter determining unit 22 is configured:

To obtain the D2D parameter of the first UE from the D2D signal detected over the first D2D transmission physical resource; or To determine the D2D parameter of the first UE from an indicator of the network side or the other UE.

Preferably the second resource hopping pattern determining unit 23 is configured:

To determine a resource hopping pattern in frequency domain between the D2D transmission physical resources of the first UE, according to the D2D parameter of the first UE; or To determine a resource hopping pattern in time domain between the D2D transmission physical resources of the first UE, according to the D2D parameter of the first UE; or To determine a resource hopping pattern in frequency domain between the D2D transmission physical resources of the first UE, according to the D2D parameter of the first UE, and to determine a resource hopping pattern in time domain between the D2D transmission physical resources of the first UE, according to the resource hopping pattern in frequency domain; or To determine a resource hopping pattern in time domain between the D2D transmission physical resources of the first UE, according to the D2D parameter of the first UE, and to determine a resource hopping pattern in frequency domain between the D2D transmission physical resources of the first UE, according to the resource hopping pattern in time domain.

Preferably the device further includes:

A first resource hopping pattern determining unit 11 is configured to determine a resource hopping pattern between a plurality of D2D transmission physical resources of the UE, according to a preset D2D parameter;

A first D2D transmission physical resource determining unit 12 is configured to determine the D2D transmission physical resources according to the resource hopping pattern determined by the first resource hopping pattern determining unit; and A D2D signal sending unit 13 is configured to send a D2D signal over the D2D transmission physical resources determined by the first D2D transmission physical resource determining unit.

That is, the units illustrated in FIG. 6 and the units illustrated in FIG. 8 can be arranged on the same UE.

Figure 9:
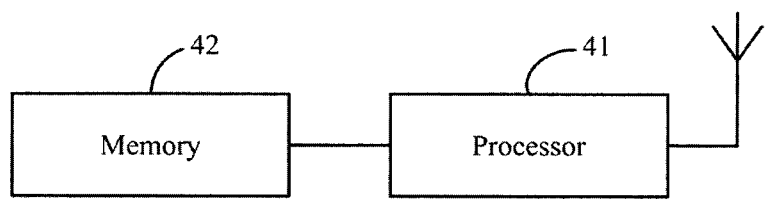
FIG. 9 is a schematic structural diagram of another UE at the receiving side according to an embodiment of the application.

Referring to FIG. 9, an embodiment of the application further provides another UE at the receiving side, where the UE includes a processor 41 and a memory 42, where the processor 41 is configured with a computer program for performing the method performed by the receiving UE according to the embodiment above of the application; the memory 42 is configured to store the computer program to configure the processor 41; and the processor can include a baseband processing component, a radio frequency processing component, and other components as needed in reality, which are configured to transmit related information. Particularly:

The processor 41 is configured to determine a first physical resource for transmitting a D2D signal of a first UE in D2D communication with the UE; to determine a D2D parameter of the first UE; to determine a resource hopping pattern between a plurality of physical resources of the first UE according to the D2D parameter of the first UE; to determine the D2D transmission physical resources over which the first UE transmits the D2D signal, according to the first D2D transmission physical resource, and the determined resource hopping pattern; and to detect the D2D signal of the first UE over the D2D transmission physical resources over which the first UE transmits the D2D signal.

Preferably the processor 41 is configured to detect the D2D signal of the first UE, and to determine a physical resource over which the D2D signal of the first UE is detected, as the first D2D transmission physical resource; or to determine the first D2D transmission physical resource for transmitting the D2D signal of the first UE, according to an indicator of the network side or the other UE.

Preferably the processor 41 is configured to obtain the D2D parameter of the first UE from the D2D signal detected over the first D2D transmission physical resource; or to determine the D2D parameter of the first UE from an indicator of the network side or the other UE.

Preferably the processor 41 is configured to determine a resource hopping pattern in frequency domain between the D2D transmission physical resources of the first UE, according to the D2D parameter of the first UE; or to determine a resource hopping pattern in time domain between the D2D transmission physical resources of the first UE, according to the D2D parameter of the first UE; or to determine a resource hopping pattern in frequency domain between the D2D transmission physical resources of the first UE, according to the D2D parameter of the first UE, and to determine a resource hopping pattern in time domain between the D2D transmission physical resources of the first UE, according to the resource hopping pattern in frequency domain; or to determine a resource hopping pattern in time domain between the D2D transmission physical resources of the first UE, according to the D2D parameter of the first UE, and to determine a resource hopping pattern in frequency domain between the D2D transmission physical resources of the first UE, according to the resource hopping pattern in time domain.

Preferably the processor 41 is further configured to perform the functions of the processor 31, that is, further configured:

To determine a resource hopping pattern between a plurality of D2D transmission physical resources of the UE, according to a preset D2D parameter;

To determine the D2D transmission physical resources according to the determined resource hopping pattern; and To send a D2D signal over the determined D2D transmission physical resources.

In summary, in the technical solutions according to the embodiments of the application, the UE determines the resource hopping pattern between the different D2D transmission physical resources according to its own D2D parameter to thereby obtain the transmission physical resources used by the D2D signal, and thus the UEs transmitting the D2D signals in the same sub-frame at some instance of time can transmit in different sub-frames during the subsequent transmission, thus improving the overall performance of transmitting the D2D signals in the system. The technical solutions according to the embodiments of the application are highly flexibly in that both the D2D discovery resource and the D2D communication resource can be determined; both the type 1 of discovery and the type 2 of discovery can be enabled. No matter whether the UEs transmitting the D2D signals in the same sub-frame transmit over the same frequency resource, they will have an opportunity to perform transmission in different sub-frames during the subsequent transmission due to the given resource hopping patterns to thereby detect the D2D signal of each other so as to improve the overall performance of D2D transmission in the system. Given the time hopping pattern (e.g., SF(i)=[SF(i−1)+PRB(i−1)] mod nSF), if there is a smaller spacing between frequency resources of UEs transmitting over the same time frequency and the different frequency resources of the transmission resource with the index (i−1), then there will be a smaller spacing between their time resources of the transmission resource with the index i; and given the limited number nSF, it will be more likely for them to occupy different sub-frames, thus achieving the effect of deploying the UE with higher in-band leakage onto the different time resources. This effect is not possible in the prior art where the same processes are applied to the conditions with different frequency resource spacings.

Those skilled in the art shall appreciate that the embodiments of the application can be embodied as a method, a system or a computer program product. Therefore the application can be embodied in the form of an all-hardware embodiment, an all-software embodiment or an embodiment of software and hardware in combination. Furthermore the application can be embodied in the form of a computer program product embodied in one or more computer useable storage mediums (including but not limited to a disk memory, an optical memory, etc.) in which computer useable program codes are contained.

The application has been described in a flow chart and/or a block diagram of the method, the device (system) and the computer program product according to the embodiments of the application. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Evidently those skilled in the art can make various modifications and variations to the application without departing from the spirit and scope of the application. Thus the application is also intended to encompass these modifications and variations thereto so long as the modifications and variations come into the scope of the claims appended to the application and their equivalents.

The invention claimed is:

1. A method for sending a Device to Device (D2D) signal, the method comprising:
   determining, by a first User Equipment (UE) resource hopping pattern between a plurality of D2D transmission physical resources of the first UE, according to a preset D2D parameter;
   determining, by the first UE, the plurality of D2D transmission physical resources according to the resource hopping pattern; and
   sending, by the first UE, a D2D signal over the plurality of determined D2D transmission physical resources;
   wherein determining, by the first UE, the plurality of D2D transmission physical resources according to the resource hopping pattern comprises:
   determining, by the first UE, an initial D2D transmission physical resource according to resource configuration information indicated by a network side or another UE; and
   determining, by the first UE, other D2D transmission physical resources according to the resource hopping pattern and the initial D2D transmission physical resource.

2. The method according to claim 1, wherein: the D2D parameter comprises any one of the following parameters:
   a hopping index of the first UE pre-configured by a network side via higher-layer signaling;
   a D2D identifier (ID) of the first UE;
   a D2D ID of a target UE of the first UE;
   a D2D application ID of the first UE;
   a D2D application user ID of the first UE;
   a D2D application user ID of the target UE of the first UE;
   a D2D device ID of the first UE;
   a D2D device ID of the target UE of the first UE;
   an IP address of the first UE;
   an IP address of the target UE of the first UE;
   Global Positioning System (GPS) location information of the first UE;
   a broadcast ID of the first UE;

information carried in the D2D signal transmitted by the first UE; and a D2D hopping configuration parameter of the first UE.

3. The method according to claim 2, wherein the D2D parameter is pre-configured by the network side.

4. The method according to claim 1, wherein the D2D signal comprises the D2D parameter.

5. The method according to claim 1, wherein determining, by the first UE, the resource hopping pattern between the plurality of D2D transmission physical resources of the first UE, according to the preset D2D parameter comprises:
    determining, by the first UE, a resource hopping pattern in frequency domain between the plurality of D2D transmission physical resources of the first UE, according to the preset D2D parameter; or
    determining, by the first UE, a resource hopping pattern in time domain between the plurality of D2D transmission physical resources of the first UE, according to the preset D2D parameter; or
    determining, by the first UE, a resource hopping pattern in frequency domain between the plurality of D2D transmission physical resources of the first UE, according to the preset D2D parameter, and determining a resource hopping pattern in time domain between the plurality of D2D transmission physical resources of the UE, according to the resource hopping pattern in frequency domain; or
    determining, by the first UE, a resource hopping pattern in time domain between the plurality of D2D transmission physical resources of the first UE, according to the preset D2D parameter, and determining a resource hopping pattern in frequency domain between the plurality of D2D transmission physical resources of the UE, according to the resource hopping pattern in time domain.

6. The method according to claim 1, wherein the preset D2D parameter is carried in the D2D signal sent by the first UE; or
    the preset D2D parameter is a prescribed parameter prescribed between the first UE and a second UE in D2D communication with the first UE; or
    the preset D2D parameter is indicated to the second UE by a network side or a UE.

7. A method for receiving a Device to Device (D2D) signal, the method comprising:
    determining, by a second User Equipment (UE), a first D2D transmission physical resource of a plurality of D2D transmission physical resources over which a first UE transmits a D2D signal;
    determining, by the second UE, a D2D parameter of the first UE;
    determining, by the second UE, a resource hopping pattern between the plurality of D2D transmission physical resources of the first UE according to the D2D parameter of the first UE;
    determining, by the second UE, the plurality of D2D transmission physical resources over which the first UE transmits the D2D signal, apart from the first D2D transmission physical resource, according to the first D2D transmission physical resource, and the determined resource hopping pattern; and
    detecting, by the second UE, the D2D signal of the first UE over a D2D transmission physical resource of the plurality of D2D transmission physical resources over which the first UE transmits the D2D signal;
    wherein the plurality of D2D transmission physical resources over which the first UE transmits the D2D signal is determined at the first UE side as follows: an initial D2D transmission physical resource of the plurality of D2D transmission physical resources over which the first UE transmits the D2D signal is determined by the first UE according to resource configuration information indicated by a network side or another UE, and other D2D transmission physical resources of the plurality of D2D transmission physical resources over which the first UE transmits the D2D signal are determined by the first UE according to the resource hopping pattern and the initial D2D transmission physical resource.

8. The method according to claim 7, wherein determining, by the second UE, the first D2D transmission physical resource of the plurality of D2D transmission physical resources over which the first UE transmits the D2D signal comprises:
    detecting, by the second UE, the D2D signal of the first UE, and determining a physical resource over which the D2D signal of the first UE is detected, as the first D2D transmission physical resource; or
    determining, by the second UE, the first D2D transmission physical resource for transmitting the D2D signal of the first UE, according to an indicator of a network side or another UE.

9. The method according to claim 7, wherein determining, by the second UE, the D2D parameter of the first UE comprises:
    obtaining, by the second UE, the D2D parameter of the first UE from the D2D signal detected over the first D2D transmission physical resource; or
    determining, by the second UE, the D2D parameter of the first UE as a prescribed parameter; or
    determining, by the second UE, the D2D parameter of the first UE from an indicator of a network side or another UE.

10. The method according to claim 7, wherein determining, by the second UE, the resource hopping pattern between the physical resources of the first UE according to the D2D parameter of the first UE comprises:
    determining, by the second UE, a resource hopping pattern in frequency domain between the plurality of D2D transmission physical resources of the first UE, according to the D2D parameter of the first UE; or
    determining, by the second UE, a resource hopping pattern in time domain between the plurality of D2D transmission physical resources of the first UE, according to the D2D parameter of the first UE; or
    determining, by the second UE, a resource hopping pattern in frequency domain between the plurality of D2D transmission physical resources of the first UE, according to the D2D parameter of the first UE, and determining a resource hopping pattern in time domain between the plurality of D2D transmission physical resources of the first UE, according to the resource hopping pattern in frequency domain; or
    determining, by the second UE, a resource hopping pattern in time domain between the plurality of D2D transmission physical resources of the first UE, according to the D2D parameter of the first UE, and determining a resource hopping pattern in frequency domain between the plurality of D2D transmission physical resources of the first UE, according to the resource hopping pattern in time domain.

11. A User Equipment, UE, comprising:
a transmitter;
a processor; and a memory storing at least one instruction, wherein the processor is configured to execute the at least one instruction to:
determine a resource hopping pattern between a plurality of Device to Device (D2D) transmission physical resources of the UE, according to a preset D2D parameter;
determine the plurality of D2D transmission physical resources according to the resource hopping pattern; and
control the transmitter to send a D2D signal over the plurality of determined D2D transmission physical resources;
wherein the processor is further configured to execute the at least one instruction to:
determine an initial D2D transmission physical resource according to resource configuration information indicated by a network side; and
determine other D2D transmission physical resources according to the resource hopping pattern and the initial D2D transmission physical resource.

12. The UE according to claim 11, wherein the D2D parameter comprises any one of the following parameters:
a hopping index of the first UE pre-configured by a network side via higher-layer signaling;
a D2D identifier (ID) of the first UE;
a D2D ID of a target UE of the first UE;
a D2D application ID of the first UE;
a D2D application user ID of the first UE;
a D2D application user ID of the target UE of the first UE;
a D2D device ID of the first UE;
a D2D device ID of the target UE of the first UE;
an IP address of the first UE;
an IP address of the target UE of the first UE;
Global Positioning System (GPS) location information of the first UE;
a broadcast ID of the first UE;
information carried in the D2D signal transmitted by the first UE; and
a D2D hopping configuration parameter of the first UE.

13. The UE according to claim 12, wherein the D2D parameter is pre-configured by the network side.

14. The UE according to claim 11, wherein the D2D signal comprises the D2D parameter.

15. The UE according to claim 11, wherein the processor is further configured to execute the at least one instruction to:
determine a resource hopping pattern in frequency domain between the plurality of D2D transmission physical resources of the UE, according to the preset D2D parameter; or
determine a resource hopping pattern in time domain between the plurality of D2D transmission physical resources of the UE, according to the preset D2D parameter; or
determine a resource hopping pattern in frequency domain between the plurality of D2D transmission physical resources of the UE, according to the preset D2D parameter, and determine a resource hopping pattern in time domain between the plurality of D2D transmission physical resources of the UE, according to the resource hopping pattern in frequency domain; or
determine a resource hopping pattern in time domain between the plurality of D2D transmission physical resources of the UE, according to the preset D2D parameter, and determine a resource hopping pattern in frequency domain between the plurality of D2D transmission physical resources of the UE, according to the resource hopping pattern in time domain.

16. The UE according to claim 11, wherein the preset D2D parameter is carried in the D2D signal sent by the D2D signal sending unit; or
the preset D2D parameter is a prescribed parameter prescribed between the UE and a second UE in D2D communication with the UE; or
the preset D2D parameter is indicated to the second UE by a network side or a UE.

17. A User Equipment, UE, comprising:
a receiver;
a processor; and
a memory storing at least one instruction, wherein the processor is configured to execute the at least one instruction to:
determine a first D2D transmission physical resource of a plurality of D2D transmission physical resources over which a first UE in D2D communication with the UE transmits a D2D signal;
determine a D2D parameter of the first UE;
determine a resource hopping pattern between the plurality of D2D transmission physical resources of the first UE according to the D2D parameter of the first UE;
determine the plurality of D2D transmission physical resources over which the first UE transmits the D2D signal, apart from the first D2D transmission physical resource according to the first D2D transmission physical resource, and the determined resource hopping pattern; and
control the receiver to detect the D2D signal of the first UE over a D2D transmission physical resource of the plurality of D2D transmission physical resources over which the first UE transmits the D2D signal;
wherein the plurality of D2D transmission physical resources over which the first UE transmits the D2D signal is determined at the first UE side as follows: an initial D2D transmission physical resource of the plurality of D2D transmission physical resources over which the first UE transmits the D2D signal is determined by the first UE according to resource configuration information indicated by a network side, and other D2D transmission physical resources of the plurality of D2D transmission physical resources over which the first UE transmits the D2D signal are determined by the first UE according to the resource hopping pattern and the initial D2D transmission physical resource.

18. The UE according to claim 17, wherein the processor is further configured to execute the at least one instruction to:
control the receiver to detect the D2D signal of the first UE and determine a physical resource over which the D2D signal of the first UE is detected, as the first D2D transmission physical resource; or
determine the first D2D transmission physical resource for transmitting the D2D signal of the first UE, according to an indicator of a network side or another UE.

19. The UE according to claim 17, wherein the processor is further configured to execute the at least one instruction to:
obtain the D2D parameter of the first UE from the D2D signal detected over the first D2D transmission physical resource; or
determine the D2D parameter of the first UE as a prescribed parameter; or determine the D2D parameter of the first UE from an indicator of a network side or another UE.

20. The UE according to claim 17, wherein the processor is further configured to execute the at least one instruction to:

determine a resource hopping pattern in frequency domain between the plurality of D2D transmission physical resources of the first UE, according to the D2D parameter of the first UE; or determine a resource hopping pattern in time domain between the plurality of D2D transmission physical resources of the first UE, according to the D2D parameter of the first UE; or determine a resource hopping pattern in frequency domain between the plurality of D2D transmission physical resources of the first UE, according to the D2D parameter of the first UE, and determine a resource hopping pattern in time domain between the plurality of D2D transmission physical resources of the first UE, according to the resource hopping pattern in frequency domain; or determine a resource hopping pattern in time domain between the plurality of D2D transmission physical resources of the first UE, according to the D2D parameter of the first UE, and to determine a resource hopping pattern in frequency domain between the plurality of D2D transmission physical resources of the first UE, according to the resource hopping pattern in time domain.

* * * * *